Sept. 5, 1961 J. L. QUINN ET AL 2,998,881

LENGTH SENSING DEVICE

Filed Oct. 30, 1957 3 Sheets-Sheet 1

INVENTORS
JAMES L. QUINN
JAMES K. DUNCAN
JAMES S. MENTZER by: Carlson, Pitzner, Hubbard & Wolfe
ATTYS.

Sept. 5, 1961 J. L. QUINN ET AL 2,998,881

LENGTH SENSING DEVICE

Filed Oct. 30, 1957 3 Sheets-Sheet 2

INVENTORS
JAMES L. QUINN
JAMES K. DUNCAN
JAMES S. MENTZER by: Carlson, Pitzner, Hubbard & Wolfe
ATTYS.

INVENTORS
JAMES L. QUINN
JAMES K. DUNCAN
JAMES S. MENTZER
by: Carlson, Pitzner, Hubbard & Wolfe
ATTYS.

United States Patent Office 2,998,881

Patented Sept. 5, 1961

2,998,881

LENGTH SENSING DEVICE

James L. Quinn, Chicago, and James K. Duncan and James S. Mentzer, Park Ridge, Ill., assignors to Cummins-Chicago Corp., Chicago, Ill., a corporation of Illinois Filed Oct. 30, 1957, Ser. No. 693,370

10 Claims. (Cl. 209—82)

The present invention relates generally to apparatus for sensing the length of a business machine card and more particularly to a device that will detect and act upon cards of non-standard length in a rapidly moving stream of cards.

Automatic business machines depend primarily upon punched sheets or cards for the storage and processing of information. Such punched cards, or so-called IBM cards, have a series of holes arranged in coded patterns representing desired information. Accurate reading of the particular pattern with the card in motion requires accurate alinement of the cards as they move sidewise through a "reading" station within the machine. Card alinement is established by positioning cards in a feeding hopper having accurately spaced side walls which engage the shorter edges of a stack of cards and thus "center" the cards in alinement with the reading station. If a card is too short, it may be skewed between the hopper side walls or shifted laterally out of proper alinement.

It should also be kept in mind that where a card is of non-standard length as a result of the original blanking operation, the entry of the data thereon by punching may be inaccurate. In short, an accurately sized card is essential for both the entry and reading of data.

Often however, buisness machine cards are subject to hard usage before the time comes to extract their coded information. For example, their edges may be crumpled and torn by carrying the cards in a pocket, or an entire card edge, or a portion of an edge, may be trimmed away by an automatic letter opener. Moreover, certain types of cutting operations in blanking cards out of paper stock are not perfectly accurate or consistent so that the length dimension may be shorter or longer than standard by an excessive amount, i.e. an amount substantially in excess of the usual tolerance of plus 0.007 and minus 0.003 inch. Since a card that is shorter than standard length cannot be accurately positioned and hence not accurately "read" it is desirable to be able to detect and separate a card of non-standard length before it is sent to an information sensing apparatus of any kind.

Length sensing, as compared to card width sensing, is particularly difficult when the cards are fed lengthwise in constant streams and at high rates of speed. For example, a card speed of 275 feet per minute is quite common, which means that a standard "money order" punched card 4⅝" long will entirely pass a given point in a machine in only approximately 0.08 second. It will therefore be apparent that an effective length sensing apparatus must be extremely sensitive and highly responsive to the most fleeting measurements.

Accordingly, it is the general aim of the present invention to provide a reliable and accurate length sensing device capable of detecting cards of non-standard length in a passing stream of cards traveling lengthwise at a high rate of speed.

In more detail, it is an object to provide a device of the above type having a desired detection response from a finite length measurement, but which remains reliable and unaffected by shorter false signals. It is a related object to provide a device of this character having a control circuit that is positive acting, trouble-free in operation, and economical to manufacture and operate.

It is a further object to provide a device as described above capable of great accuracy in measuring slight deviations from a standard length and which may be readily adjusted to establish a desired reference standard. It is a collateral object to provide a length sensing device which may be instantly conditioned for responding with equal reliability and accuracy to variations from selected alternative standard lengths.

Other objects and advantages of the invention will become apparent upon reading the attached detailed description and upon reference to the drawings in which.

Figure 6A:
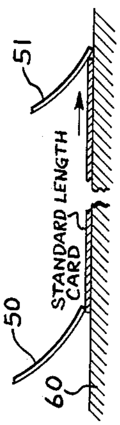
Figure 6B:
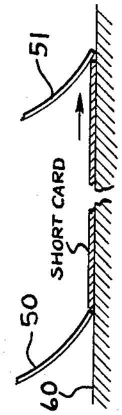
Figure 2:
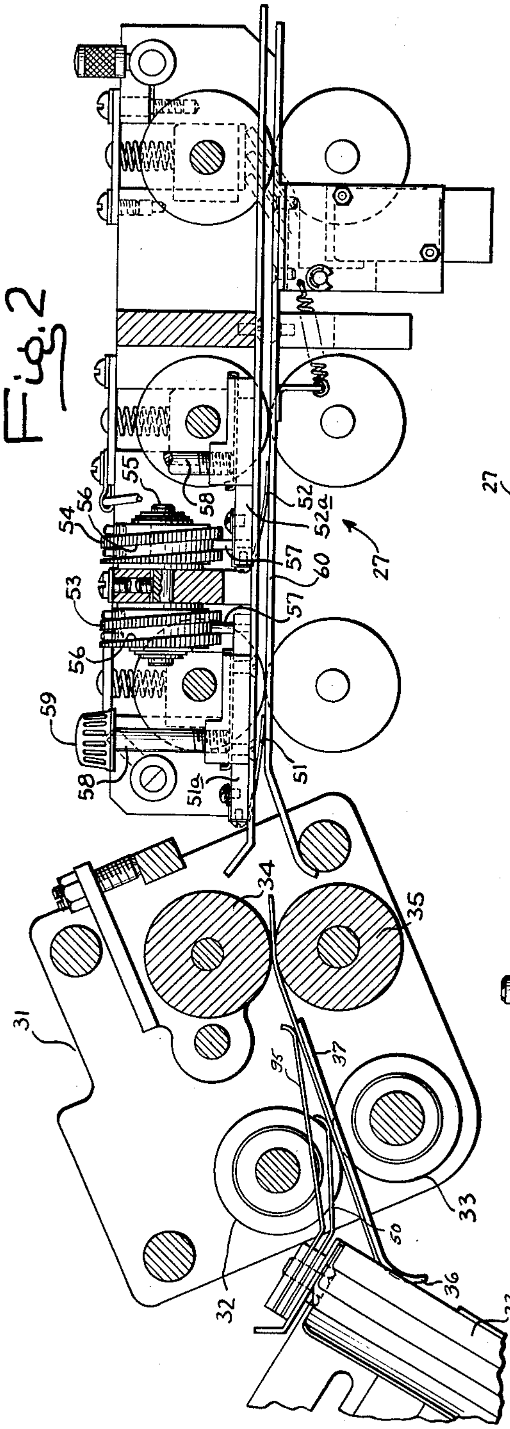
FIG. 2 is a longitudinal sectional view of the measuring unit in the machine shown in FIG. 1 including a set of length sensing detector elements.
Figure 3:
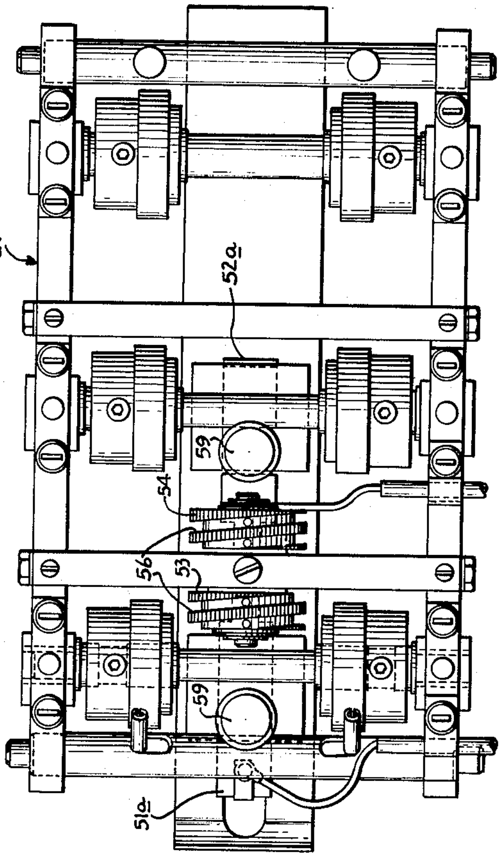
FIG. 3 is a plan view of the measuring unit shown in FIG. 2.

FIGS. 6*a* and 6*b* are fragmentary sectional views of the detector elements shown in FIG. 2 as they would appear when sensing a standard and a "short" card.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Figure 1:
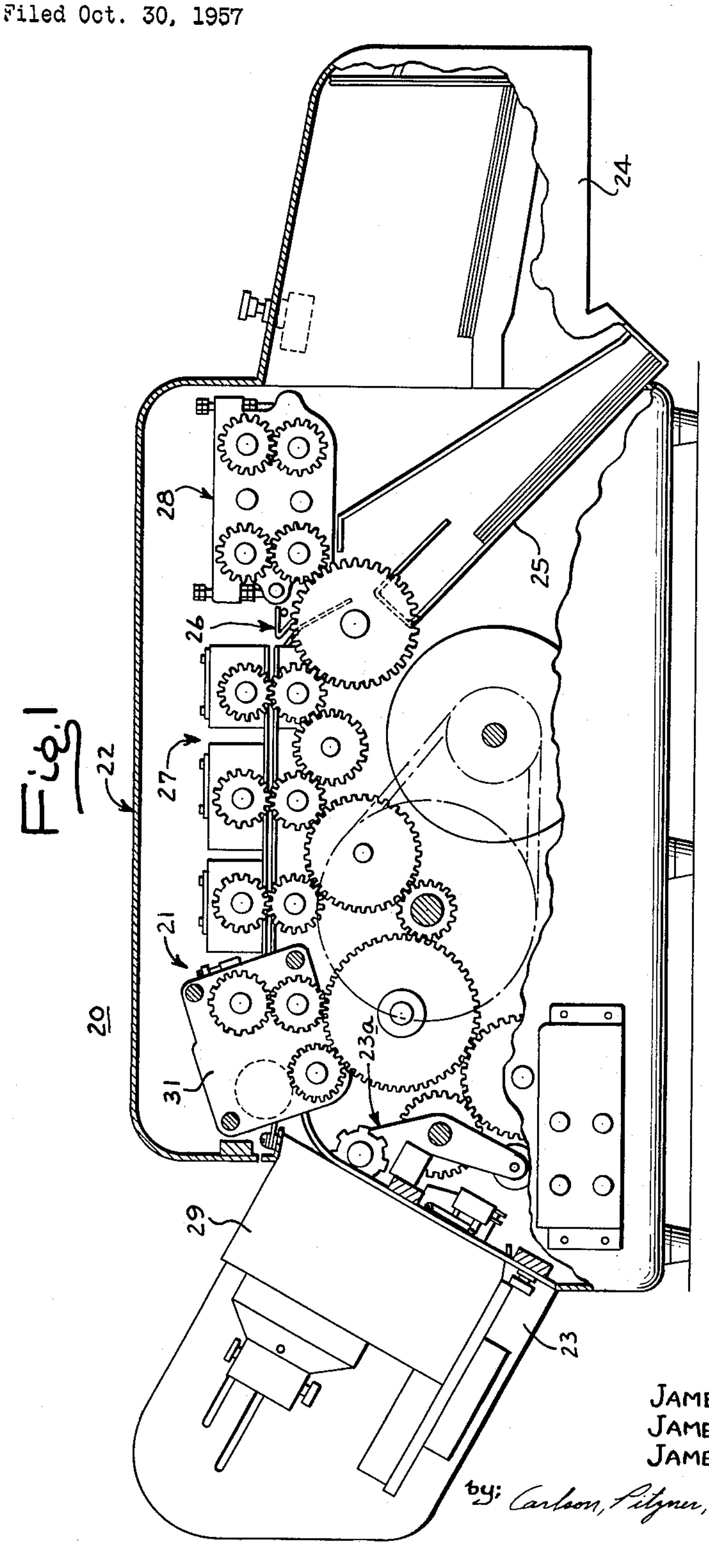
FIGURE 1 is a side view in partial section of a reconditioning machine for business machine cards employing the present invention.

Turning first to FIG. 1, there is shown a business machine 20 for handling punched cards and in which a measuring or length sensing unit 21 embodying the present invention has been installed. The particular machine shown by way of example is a punched card reconditioning machine known as a "Carditioner," which is fully disclosed in the co-pending patent application, Serial No. 484,052, filed January 25, 1955, now Patent No. 2,857,825, and assigned to the assignee of the present invention. It will be understood, however, that the length sensing device of this invention can be used in conjunction with any type of card handling apparatus, and its illustrated application to a reconditioning machine is only by way of example.

Briefly, the machine 20 shown in FIG. 1 comprises a main body portion 22 from which extends a card input hopper 23 having a feeding unit **23*a* at the left of this figure and two card receiving hoppers 24, 25 at the right hand or discharge end. The hopper 24 is the regular delivery hopper, and the hopper 25 is a reject hopper into which non-standard cards are diverted. The sensing unit 21 is positioned to receive cards as they are fed from the feeding unit 23*a***. The sensing unit may include means for measuring the thickness of the cards in accordance with the teachings of the above mentioned application Serial No. 484,052, and the width of the cards in the manner and with the apparatus shown in co-pending patent application Serial No. 670,939 filed July 10, 1957, and also assigned to the assignee of the present invention. Since the thickness and width measuring functions are described fully in the respective co-pending applications, attention herein will be restricted to the length sensing elements to be described in detail.

To separate the cards which are found not to be of the correct dimension, a rejecting unit 26 is provided. It will suffice to say for the present that the rejecting unit is selectively operable under the control of the sensing unit 21 to either allow cards of standard length to pass through the machine so that they finally fall into the delivery hopper 24, or to deflect cards that are not of correct dimension downwardly into the reject hopper 25, from which they can be manually removed for repunching or correction.

In order to carry cards from the sensing unit 21 to the rejecting unit 26, a transport unit 27 is provided comprising a series of cooperating driven rolls. Cards that are found to be of standard length are allowed to pass from the transport unit through a conditioning unit 28 on their way to delivery hopper 24.

In operation, a stack of cards 29 is placed in the hopper 23. The feeding unit 23a feeds cards one by one in rapid succession from the stack to the sensing unit 21 where their length is measured according to the invention set forth below. At this point the cards are traveling lengthwise at an approximate velocity of 275 ft. per minute. From the sensing unit 21, cards are fed in a steady stream, seriatim, by the transport unit 27 to the rejecting unit 26. Those cards which are found to be of non-standard length are deflected from the stream by the rejecting unit 26 while the standard cards pass through the conditioning unit 28 to the delivery hopper 24.

The sensing unit 21 includes a sub-frame 31 adapted to receive cards from the feeding unit 23a and start them in their lengthwise travel through the machine. Journaled within the sub-frame are two sets of rollers 32, 33 and 34, 35. Rollers 32, 33 serve as "pull" rolls, that is, they draw a card into the machine that has been separated from the stack 29 by the feeding unit 23a. The rollers 32, 33 pull the card from the feeding unit around a curved bottom portion 36 of the hopper 23, driving it along a guide plate 37. The rollers 34, 35 engage the card as it moves along the guide plate 37 and propel it into the driven rolls of the transport unit 27.

For the purpose of deflecting cards not of standard length from a stream of cards flowing through the "Cardi-tioner" unit, the rejecting unit 26 (see FIG. 4) is provided with a pivoted vane-type deflector 41 which is actuated into the dotted line position by means of a solenoid 42. For coupling the solenoid to the vane, deflector gears 43, 44 are employed, the gear 43 being connected to the deflector and the gear 44 being connected to the solenoid for rocking movement by an arm 45. A spring 46 holds the arm upward against a suitable stop 47.

It will be apparent that under normal conditions, with the vane 41 lowered, cards are allowed to pass to the delivery hopper 24. However, when the solenoid is energized, the arm 45 is pulled down, accompanied by clockwise rotation of the deflector 41 into its upraised position so that the oncoming card is deflected downwardly into the reject hopper 25.

In accordance with the present invention, a novel sensing circuit is provided including first and second detectors spaced along the path of movement of the cards at a distance varying slightly from the length of a standard card, and a control circuit for the deflector 26 is coupled to the sensing circuit so as to be energized when the detectors sense a card of non-standard length. In the present embodiment, a first detector comprising an electrical contact 50 and a second detector comprising a pair of alternately usable electrical contacts 51, 52 are used. It will be understood that punched cards conventionally come in either one of two standard sizes, the so-called "51-column" or the "80-column" length. When the shorter 51-column cards are being utilized in the machine, the contact 51 cooperates with the contact 50 in the sensing unit, and when the longer 80-column cards are passed through the machine, the alternate contact 52 co-operates with the rear contact 50.

To adjust the distances between the contact 50 and the contacts 51, 52, the latter are mounted on slides 51a and 52a respectively which are movable longitudinally of the transfer unit 27. The slides 51a, 52a are adjustably positioned by means of a pair of adjusting drums 53, 54 journaled on a shaft 55 supported by the sub-frame of the transfer unit 27. The drums 53, 54 are provided with helical grooves 56 which receive upstanding pins 57 mounted on the respective slides 51a, 52a.

It can therefore be seen that rotation of the drums 53, 54 causes the slides 51a, 52a to move longitudinally of the transfer unit to a desired position. To lock the slides in adjusted position, each is provided with a locking screw 58 having a tightening knob 59. Turning the knob 59 causes the associated screw 58 to bear against the underlying slide, clamping it in place.

To form a sensing circuit, the first and second detectors are coupled in series (see FIG. 5) so that a circuit is completed when the contacts of both detectors engage the underlying frame plate 60 of the machine over which the cards ride. The sensing circuit includes a manually operable switch 65 which alternately permits either the contact 51 or the contact 52 to effectively co-operate with the rear contact 50. The circuit also includes a resistor 66 connected in series with the contacts which is effective to reduce the voltage in the sensing circuit and permit the use of simple leaf switches for contacts 50—52 without danger of arcing.

When detecting cards of shorter than standard length, the contact 51 is adjusted relative to the contact 50 so that the distance between their respective contact points with the frame plate 60 is slightly less than the length of a standard 51-column punched card. The contact 52 is likewise adjusted so that the distance between it and the contact 50 is slightly less than the length of a standard 80-column punched card. It can therefore be seen that when a normal, standard length, card passes through the sensing unit, the first and second detectors will not be simultaneously actuated. That is, a standard length 51-column card passing beneath the contacts 50, 51 (see FIG. 6a) will prevent both of these contacts from simultaneously engaging the frame plate 60 and thus completing the sensing circuit. However, when a shorter than standard card passes through the sensing unit, the rear contact 50 will be allowed to drop into engagement with the frame plate before the front end of the card lifts the contact 51. Thus, both of the contacts 50 and 51 will simultaneously engage the frame and complete the sensing circuit.

To operate the deflector 26 in response to the completion of the sensing circuit, a control relay 67 is provided. Energization of the relay 67 by means of power derived from a power source 68 causes the relay to pick up and close the contacts 69 which completes a circuit energizing the deflector solenoid 42. Simultaneously, the relay 67 also closes a set of contacts 70 which completes a circuit to energize an indicator light 71 so that the operator of the machine 20 will understand that the card being deflected to the reject hopper 25 has been "rejected" by the length sensing device. The control circuit also includes an on-off switch 72 which is manually operated and effective to disable the control circuits.

In carrying out the present invention means are provided in the control circuit for producing an electrical signal of sufficient duration to produce reliable operation of the relay 67 in response to triggering by a fleeting electrical impulse resulting from passage of a short card. In the illustrated embodiment, the device for triggering the control circuit is a grid controlled gaseous tube 75 of the "Thyratron" type. The cathode and anode terminals 76, 77 of the tube 75 are connected in series with the control relay 67 and the power source 68, so that normally the tube 75 keeps the control circuit open and the relay 67 de-energized. The grid terminal 78 of the tube 75 is coupled to the sensing circuit so that a momentary electrical impulse transmitted through the sensing circuit to the grid will be effective to fire the tube and cause it to become conductive. This will energize the control circuit and pick up the relay 67 to operate the deflector 26.

To prevent transient or stray electrical impulses in the sensing circuit from firing the tube 75, an electrical dampening means in the form of a resistor 81 and a capacitor 86 coupled in a R-C network between the detectors and the tube grid terminal 78 is provided. In this way, transient impulses will be ineffective to fire the tube 75, yet the tube will remain sensitive and effective to energize the control circuit upon the momentary completion of the sensing circuit caused by a passing non-standard length card. By using a capacitor 86 having a capacitance on the order of 0.01 mf. and a resistor 81 having a resistance on the order of 10,000 ohms, the R-C circuit will have a time constant of approximately 100 microseconds and will therefore be responsive only to those impulses having a duration of 100 microseconds or more. This corresponds to a card short by about 0.005 inch at a card speed of 275 feet per minute, well within the limit of operational tolerance.

In order to stabilize the circuit controlling the tube 75 and insure uniform operation of the tube, a voltage divider network comprising resistors 83, 84 is coupled between the anode, cathode, and grid terminals, respectively, and a capacitor 82 links the divider network to the detectors, so as to maintain the grid at a fixed normal electrical potential relative to the cathode. In addition, a diode rectifier 85 is coupled in parallel to the capacitor 86 so that negative impulses in the sensing circuit will by-pass the capacitor and not charge it reversely with respect to the normal positive impulse imparted by the sensing circuit.

To limit the output of the control circuit to a predetermined time interval, timing means are provided to drop out the relay 67 after it has been energized a sufficient length of time to positively operate the deflector 26 and reject the desired card. In the illustrated embodiment, the timing means comprises a normally closed switch 91 in series with, and operated by, the relay 67, and a capacitor 92 connected in parallel with the switch 91. It can thus be seen that upon energization of the control circuit, current flow in the control circuit will be through the closed contacts of the switch 91. As soon as the relay picks up, the switch 91 will open so as to break the control circuit. However, current flow will continue through the relay 67, temporarily maintaining it in its picked up condition due to the presence of the capacitor 92. The delay interval brought about by the capacitor 92 may be on the order of 0.025 of a second using a capacitance of 0.1 mf. When this capacitor has been fully charged, the current flow in the control circuit ceases so that the relay 67 drops out. The tube 75 therefore ceases to conduct and returns to its normal circuit breaking condition.

For the purpose of disabling the sensing circuit until a card to be "measured" is actually passing the first and second detectors, a gating switch 95 is provided. When both the contact 50 and the switch 95 rest against the frame plate 60, is can be seen that the power source 68 is disabled, or shorted out, so that although the contacts 50 and 51 both rest on the machine frame, no power is available to transmit a triggering impulse to the grid of the tube 75. However, when a card is passed into the sensing unit, the contact 50 and the switch 95 are lifted from the frame plate 60 of the machine so as to able the power source. It will be appreciated that so long as the switch 95 is maintained in open condition, that is raised from the plate 60, the simultaneous engagement of the contacts 50, 51, or 50, 52, with the frame of the machine will cause a triggering impulse to be imparted to the grid of the tube 75.

Figures 4, 5:
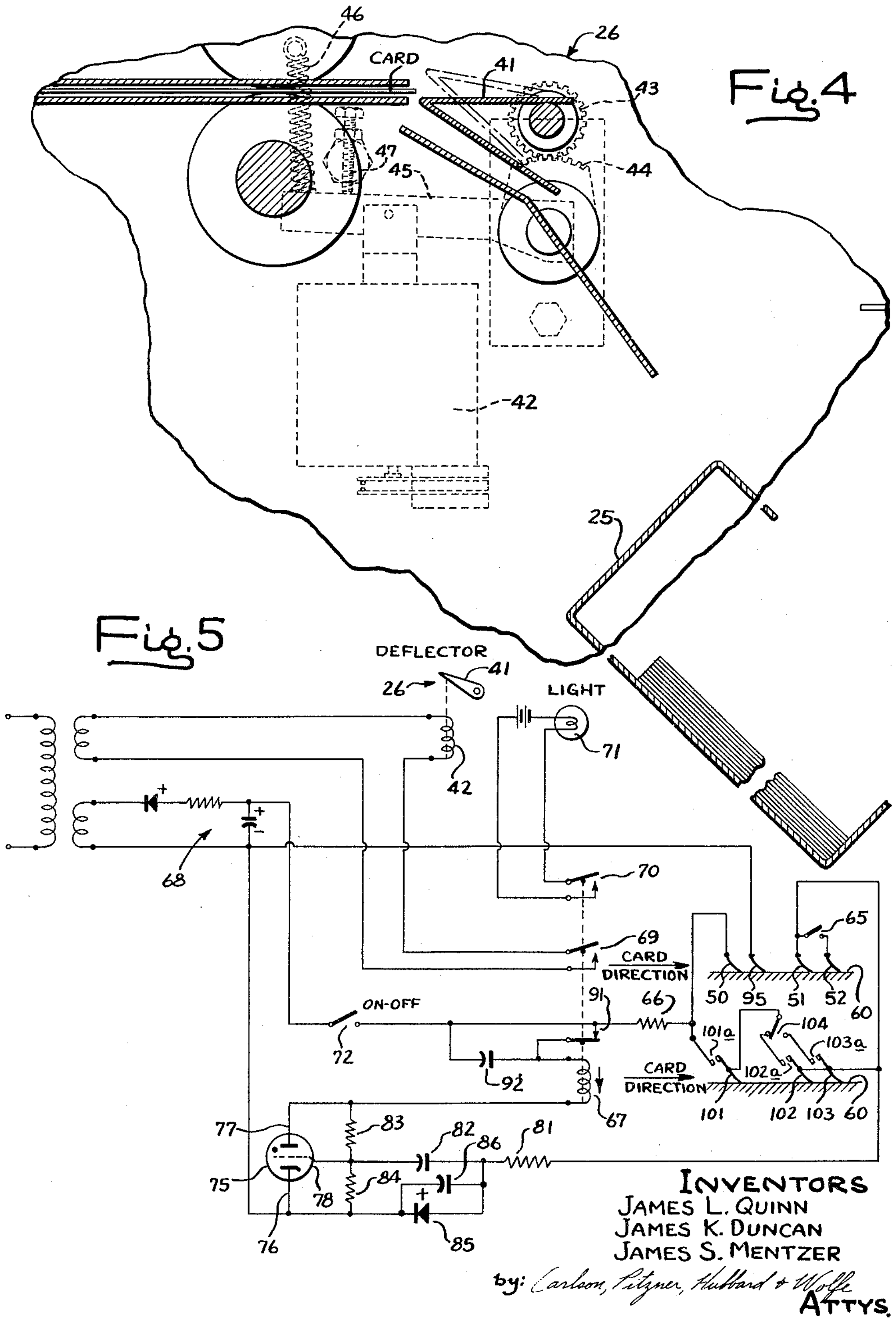
FIG. 4 is a fragmentary view showing the deflector arrangement used for directing cards into a reject hopper.
FIG. 5 is a schematic wiring diagram of the control circuit employed with the present invention.

To briefly summarize the operation of the disclosed length sensing device, it will be recalled that cards pass through the machine from left and right, as viewed in FIGS. 2 and 5, so as to lift the contacts 50, 51, 52 and the switch 95 from the frame plate of the machine. To condition the control and sensing circuits for operation, the on-off switch 72 is first closed and the switch 65 is opened or closed to select which of the two contacts 51, 52 is to effectively co-operate as a second detector with the first detector contact 50. Although both contacts 50 and 51 engage the frame plate 60 of the machine before the cards begin moving therethrough, no signal impulse is transmitted through the sensing circuit since the contact 50 and the switch 95 effectively short out the power source 68.

When a standard length card is moved through the machine, the contact 50 and the switch 95 are first lifted by the forward edge of the card. Continued movement of the card lifts the contact 51 before the contact 50 is released, so that, the contacts 50 and 51 do not simultaneously engage the frame plate 60. Therefore, assuming that switch 65 is open, passage of the standard length card does not effect the length sensing device.

When a shorter than standard length card passes through the machine, the contact 50 is allowed to drop into engagement with the plate 60 before the contact 51 is lifted. Thus, for a fleeting period, the switch 95 is open and the contacts 50, 51 are closed so as to couple the positive side of the power source 68 to the grid terminal 78 of the tube 75. The resulting positive impulse is, however, very fleeting. Assuming a card speed of 275 ft. per minute, a non-standard card that is short by 1/32 of an inch will momentarily complete the sensing circuit for a period of only approximately 0.0006 second. This momentary completion of the sensing circuit is sufficient however to traverse the RC circuit 81, 86 to positively charge the grid of the tube 75 with respect to the cathode so that the gaseous tube will fire and become conductive.

When the tube 75 is triggered, the control circuit is completed through the normally closed switch 91 to energize the control relay 67. Although the sensing impulse is momentary and fleeting, the tube 75, being gaseous, will continue conducting until the relay 67 picks up and operates the contacts 69 and 70 which complete circuits operating the deflector 26 and the indicator light 71, respectively. Picking up of the relay 67 opens the normally closed contacts 91 and therefore the relay remains energized only for the interval required to charge the capacitor 92. When this capacitor is charged, the circuit is, in effect, open, so that the relay drops out and the tube 75 returns to its normal non-conducting condition. The sensing and control circuit are then immediately prepared to "measure" subsequent cards in the series flowing through the machine 20.

While the above described apparatus has been primarily directed toward the sensing of short cards, a simple additional sensing circuit can be utilized with the described control circuit for detecting and rejecting cards which are undesirably longer than standard. In the preferred embodiment, the long card sensing circuit comprises a rear switch operating detector 101 and a spaced pair of forward switch operating detectors 102, 103. The detectors 102, 103 are comparable to the pair of contacts 51, 52, and similarly, by means of a two-position switch 104, either the detector 102 or the detector 103 can be utilized for "measuring" 51 column or 80 column cards, respectively.

Each of the detectors 101, 102, 103 is loosely pivoted and adapted to operate pairs of normally open contacts **101*a*, 102*a* and 103*a***, respectively. When the detectors are swung by the card passing thereunder, they are effective to close their associated contacts.

The points at which the detectors 101, 102 contact the frame plate 60 are spaced a distance slightly greater than the length of a standard 51 column card. Similarly, the distance between the points at which the detectors 101, 103 contact the frame plate 60 is slightly greater than the length of a standard 80 column card. Thus, it can be seen that when a long card passes through the machine and beneath the detectors, both the rear detector 101 and one of the front detectors 102, 103 will be simultaneously lifted. This will be effective to complete a circuit through the contacts **101*a*, switch 104 and the selected set of contacts 102*a* or 103*a*, so as to transmit a fleeting sensing pulse to the control circuit. The control circuit will function in the same manner as described above when a short card is detected so that the relay 67** will be effective to deflect and reject the longer-than-standard card.

For the sake of simplicity in understanding the present invention, the relay 67 has been shown connected directly to the diverting solenoid 42. This is a satisfactory arrangement where the cards are well spaced. Where cards follow in close sequence, however, it is desirable to use auxiliary circuitry of the type set forth in copending application Serial No. 577,723 filed April 12, 1956, now Patent No. 2,903,133, and owned by the same assignee.

It can thus be appreciated that the disclosed circuit of the present invention operates somewhat as a "pulse stretcher" in that the fleeting momentry completion of the sensing circuit for the brief period in which a short card lies between the contacts 50 and 51, or a long card engages both detectors 101 and 102, causes a much longer "pulse" to be transmitted through the control circuit and the control relay 67 so that the latter will be effective to operate the desired card handling and indicator devices.

We claim as our invention:

1. In a business machine for handling business machine cards, the combination comprising, means defining a measuring station, means for conveying cards seriatim along a path past said station, first and second contacts at said station spaced along said path at a distance slightly less than the length of a standard card, a sensing circuit, means coupling said contacts to complete said circuit when both contacts are closed, a control circuit, a device connected to the output of said control circuit, and means responsive to the momentary completion of said sensing circuit for energizing said control circuit for a sustained interval required to operate said device.

2. In a business machine for handling business machine cards, the combination comprising, a measuring station, means for conveying cards seriatim along a path past said station, first and second detectors at said station spaced along said path at a distance varying slightly from the length of a standard card, a sensing circuit including means coupling said detectors so as to complete said circuit when both detectors simultaneously respond to a card of non-standard length, a control circuit, a card handling device connected to the output of said control circuit, and means responsive to the momentary completion of said sensing circuit for energizing said control circuit for a sustained interval required to operate said card handling device.

3. In a business machine for handling business machine cards, the combination comprising, means defining a measuring station, means for conveying cards seriatim along a path past said station, first and second electrical contacts at said station spaced along said path a distance slightly less than the length of a standard card, a sensing circuit including means coupling said contacts to complete said circuit when both contacts are closed, a control circuit including timing means to limit energization of the circuit to a predetermined time interval, a tripping device responsive to momentary completion of said sensing circuit for energizing said control circuit, and a card handling device coupled to the output of said control circuit and operable upon energization of said circuit.

4. In a business machine for handling business machine cards, the combination comprising, means defining a measuring station, means for conveying cards seriatim along a path past said station, a sensing circuit including first and second contacts at said station spaced along said path a distance slightly less than the length of a standard card so that the circuit is complete upon passage of a card shorter than standard length, a control circuit connected to said sensing circuit and having means therein capable of being triggered by an impulse from said sensing circuit for producing a sustained output signal, timing means to limit the output signal to a predetermined time interval, a receiving hopper for receiving cards of standard length, and a card handling device for deflecting a card from said hopper of shorter than standard length in response to said output signal.

5. In a business machine for handling business machine cards, the combination comprising, means defining a measuring station, means for conveying cards seriatim along a path past said station, first and second detectors at said station spaced along said path a distance varying slightly from the length of a standard card, a sensing circuit, including means coupling said detectors so as to complete said circuit when both detectors simultaneously respond to a card of non-standard length, a control circuit including timing means to limit energization of the circuit to a predetermined time interval, said control circuit also including a tripping device responsive to momentary completion of said sensing circuit for energizing said control circuit, and a card handling device coupled to the output of said control circuit and operable upon energization of said circuit.

6. In a business machine for handling business machine cards, the combination comprising, means defining a measuring station, means for conveying cards seriatim along a path past said station, a sensing circuit including first and second detectors at said station spaced along said path a distance varying slightly from the length of a standard card so that the circuit is complete upon passage of a card of non-standard length, a control circuit connected to said sensing circuit and having a tripping device capable of being triggered by a momentary impulse from said sensing circuit for energizing said circuit and producing a sustained output signal, timing means to limit energization of the circuit to a predetermined interval, and a card handling device coupled to said control circuit and operable in response to energization of said circuit.

7. In a business machine for handling business machine cards, the combination comprising means defining a measuring station, means for conveying cards seriatim along a path past said station, a sensing circuit including first and second contacts at said station spaced along said path at a distance slightly less than the length of a standard card, so that the circuit is complete upon passage of a card shorter than standard length, a control circuit including a grid controlled gaseous tube, said sensing circuit being coupled to the grid of said tube so that momentary completion of said sensing circuit will fire said tube and energize said control circuit, and a card handling device operable upon energization of said control circuit.

8. In a business machine for handling business machine cards, the combination comprising means defining a measuring station, means for conveying cards seriatim along a path past said station, a sensing circuit including first and second contacts of said station spaced along said path at a distance slightly less than the length of a standard card so that the circuit is complete upon passage of a card shorter than standard length, a control circuit including a grid controlled gaseous tube and timing means to limit energization of the circuit to a predetermined time interval, said sensing circuit being coupled to the grid of said tube so that momentary completion of said sensing circuit will fire said tube and energize said control circuit and a card handling device operable upon energization of said control circuit.

9. In a business machine for handling business machine cards, the combination comprising means defining a measuring station, means for conveying cards seriatim along a path past said station, a sensing circuit including first and second contacts at said station spaced along said path at a distance slightly less than the length of a standard card so that the circuit is complete for a brief period upon passage of a card shorter than standard length, a control circuit including a grid controlled gaseous tube, said sensing circuit being coupled to the grid of said tube so that momentary completion of said sensing circuit will fire said tube and energize said control circuit, dampening means in said sensing circuit to prevent firing of said tube by transient electric impulses in the circuit existing less than said brief period, and a card handling device operable upon energization of said control circuit.

10. In a business machine for handling business machine cards, the combination comprising means defining a measuring station, means for conveying cards seriatim along a path past said station, first and second detectors at said station spaced along said path at a distance varying slightly from the length of a standard card, a sensing circuit including means coupling said detectors so as to complete said circuit when both detectors simultaneously sense a card of non-standard length, a control circuit including a grid controlled gaseous tube, said sensing circuit being coupled to the grid of said tube so that momentary completion of said sensing circuit will fire said tube and energize said control circuit, and a card handling device operable upon energization of said control circuit.

References Cited in the file of this patent

UNITED STATES PATENTS

| | | |
|---|---|---|
| 1,706,632 | Onstad | Mar. 26, 1929 |
| 2,112,621 | Henszey et al. | Mar. 29 1938 |
| 2,138,645 | Rey | Nov. 29, 1938 |
| 2,636,601 | Bovay et al. | Apr. 28 1953 |
| 2,708,514 | Maul | May 17, 1955 |